US011407594B2

(12) United States Patent
Tzschichholtz

(10) Patent No.: US 11,407,594 B2
(45) Date of Patent: Aug. 9, 2022

(54) METHOD FOR TRACKING PACKAGES ON A CONVEYOR SECTION

(71) Applicant: Deutsche Post AG, Bonn (DE)

(72) Inventor: Ingo Tzschichholtz, Frankfurt am Main (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 17/183,845

(22) Filed: Feb. 24, 2021

(65) Prior Publication Data

US 2021/0276812 A1 Sep. 9, 2021

(30) Foreign Application Priority Data

Feb. 27, 2020 (DE) ...................... 10 2020 105 217.0

(51) Int. Cl.
*B65G 43/08* (2006.01)
(52) U.S. Cl.
CPC ...... *B65G 43/08* (2013.01); *B65G 2203/0233* (2013.01); *B65G 2203/0291* (2013.01); *B65G 2203/044* (2013.01)
(58) Field of Classification Search
CPC ............ B65G 43/08; B65G 2203/0233; B65G 2203/0291; B65G 2203/044
(Continued)

(56) References Cited

U.S. PATENT DOCUMENTS 5,335,777 A * 8/1994 Murphy ................. B65G 43/08
198/349.8
10,422,852 B1 * 9/2019 Thiagarajan .......... G01S 5/0278

FOREIGN PATENT DOCUMENTS

DE 10 200 025 781 12/2006

OTHER PUBLICATIONS

DE Office Action (w/ English translation) for corresponding DE Application No. DE 10 2020 105 217.0, dated Oct. 28, 2020, 12 pages.

* cited by examiner

*Primary Examiner* — Gene O Crawford
*Assistant Examiner* — Lester Ill Rushin
(74) *Attorney, Agent, or Firm* — Dority & Manning, P.A.

(57) ABSTRACT

In a method for tracking packages on a conveyor section, the tracking rate of packages is intended to be maximized. This is achieved by providing a method for tracking packages on a conveyor section, the method comprising the following steps: a) providing a conveyor section having a conveyor surface for conveying a sequence of packages, the conveyor section comprising at least one photoelectric barrier for detecting the packages, b) detecting a photoelectric barrier pattern by means of the photoelectric barrier, the photoelectric barrier pattern being caused by the sequence of packages, c) detecting a conveyor speed of at least one subsection of the conveyor section, d) estimating an event sequence which has with the highest probability caused the photoelectric barrier pattern, while taking into account the conveyor speed of the conveyor section, by means of an algorithm, the algorithm comprising the following further steps: e) compiling a list of possible event sequences, f) sorting the event sequences with the aid of their occurrence probability, g) extending the most probable event sequence by all possible consecutive events, the probability of the event sequence being determined for each extension, h) incorporating the extensions as a new event sequence into the list of event sequences, i) repeating steps g) to h) until the most probable event sequence fully reflects the detected photoelectric barrier pattern.

7 Claims, 3 Drawing Sheets

Figure 1:
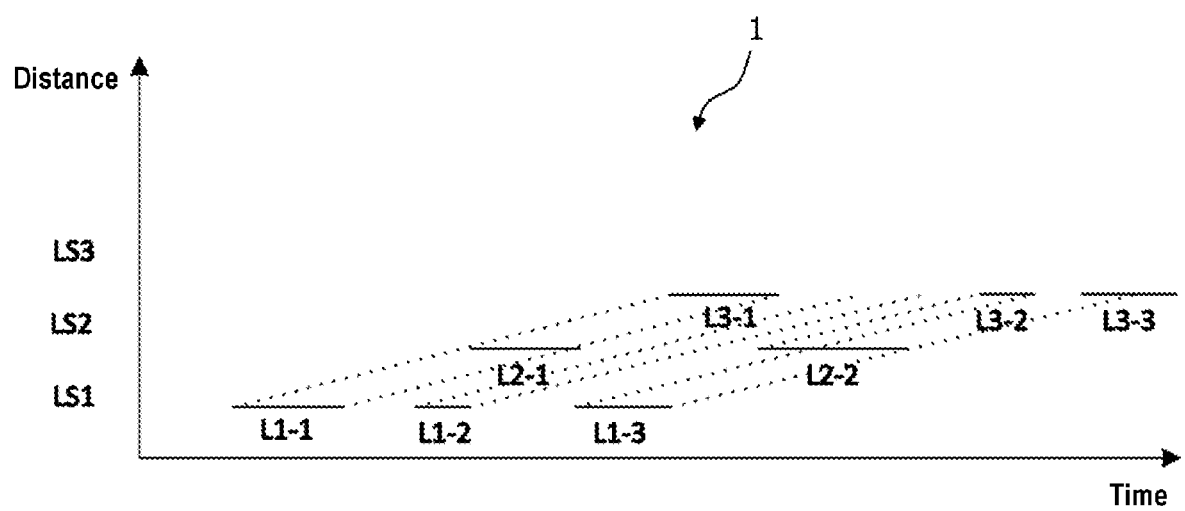

(58) Field of Classification Search
USPC .................................................. 198/460.1
See application file for complete search history.

METHOD FOR TRACKING PACKAGES ON A CONVEYOR SECTION

This application is based upon and claims the right of priority to German Patent Application No. 102020105217.0 filed on Feb. 27, 2020, the disclosure of which is hereby incorporated by reference herein in its entirety for all purposes.

The invention relates to a method for tracking packages on a conveyor section. The invention also relates to a computer program product comprising instructions which, when carried out by means of a data processing device, cause the data processing device to carry out the steps of the method.

Conveyor sections are used in many fields for transporting and sorting packages. Great importance is therefore attached to precise determination of the position of the packages along the conveyor section. For some conveyor sections, the position of the package is determined for example by detection of the passage of the package by an individual photodetector which is positioned next to the conveyor section. When the package moves past the individual photodetector, its position is determined, for example, by how far the conveyor belt of the conveyor section has moved since the detection of the package. This method known from the prior art for determining the position of packages is susceptible to irregularities. Irregularities may for example be packages temporarily being pushed together, packages temporarily slipping on the conveyor section, packages jumping on the conveyor section, and temporary jamming of packages. Because of measurement inaccuracies, slipping and other factors, this calculation of the position of the package on the conveyor section is affected by significant uncertainty. This uncertainty of the position of the package on the conveyor section makes the tracking of the package along the conveyor section according to the prior art difficult.

On the basis of the prior art mentioned above, the object of the invention is therefore to provide a method for tracking packages on a conveyor section, the tracking rate of packages in the connecting conveyor technology at a discrete position being intended to be maximized. In particular, it is an object of the present invention to eliminate or correct interruptions or errors in the continuous tracking of packages between a first point and a discrete position, for example caused by incorrect triggering or lack of triggering of photoelectric barriers, by slipping of the packages on the conveyor surface, and by packages being pushed together, removed or added at arbitrary positions of the conveyor section. At the same time, the tracking error rate is intended to be kept minimal.

The object is achieved according to the invention by the features of the independent claims. Advantageous configurations of the invention are specified in the dependent claims.

The invention therefore provides a method for tracking packages on a conveyor section, the method comprising the following steps:
 a) providing a conveyor section having a conveyor surface for conveying a sequence of packages, the conveyor section comprising at least one photoelectric barrier for detecting the packages,
 b) detecting a photoelectric barrier pattern by means of the photoelectric barrier, the photoelectric barrier pattern being caused by the sequence of packages,
 c) detecting a conveyor speed of at least one subsection of the conveyor section,
 d) estimating an event sequence which has with the highest probability caused the photoelectric barrier pattern, while taking into account the conveyor speed of the conveyor section, by means of an algorithm, the algorithm comprising the following further steps:
 e) compiling a list of possible event sequences,
 f) sorting the event sequences with the aid of their occurrence probability,
 g) extending the most probable event sequence by all possible consecutive events, the probability of the event sequence being determined for each extension,
 h) incorporating the extensions as a new event sequence into the list of event sequences,
 i) repeating steps g) to h) until the most probable event sequence fully reflects the detected photoelectric barrier pattern.

The basic concept of the present invention is thus, by means of an algorithm, with the aid of given system parameters over time with a given geometry of the conveyor section, to assign the most probable package at a discrete position in the conveyor section profile to each photoelectric barrier signal. In this case, starting from an empty set, a list of possible event sequences is compiled and sorted with the aid of their occurrence probability. The most probable event sequence is then extended by all possible consecutive events, the probability of the sequence is determined for each of these extensions, and all extensions are correspondingly incorporated as new possible event sequences into the list of event sequences. This is repeated until the most probable event sequence reflects the entire measured event chain. With the aid of the given system parameters, for example with the aid of signal profiles as a function of time of photoelectric barriers along the conveyor section and the conveyor speed of the conveyor section, by means of an algorithm it is possible to achieve a higher tracking rate together with a tracking error rate which is no higher in comparison with, for example, tracking by decentral material flow control. An event sequence in this case consists of a plurality of events which are caused in succession because of the sequence of packages.

In one embodiment of the invention, the step of estimating an event sequence, which has with the highest probability caused the photoelectric barrier pattern, is carried out by means of a Viterbi algorithm. The Viterbi algorithm is a dynamic programming algorithm for determining the most probable sequence of hidden states for a given Hidden Markov Model (HMM) and an observed sequence of symbols. Hidden Markov models are Markov chains in which something is output at each transition, the output in turn being determined by a probability distribution. With this system, it is possible to determine the probability with which there is a particular state. To this end, it is necessary to know what these probabilities were at the time of initialization. There are also processes that cannot be directly observed, but only signals of which can be detected and evaluated. These must then be sufficient to draw conclusions about the real situation. Statistical modeling such as the hidden Markov model is suitable for describing such nondeterministic processes taking place in obscurity. Often, it is not in fact possible to observe a system directly, and it is merely possible to see the effects which it has on its environment. A hidden Markov model consists of n states, although these cannot be observed directly. At each time t, each of these states emits a randomly selected visible symbol, also referred to as a visible state. The present problem involves finding, for a particular HMM, the sequence of hidden states which has with the highest probability generated the observed sequence.

In a further embodiment of the invention, the probability comprises a probability factor, the probability factor lying between 0 and 1, in which case an event that can be explained by the photoelectric barrier pattern has a probability factor of 1 and an event that cannot be explained by the photoelectric barrier pattern has a probability factor of 0.

In one embodiment of the invention, the consecutive events are determined with the aid of a photoelectric barrier pattern of at least one further photoelectric barrier. A further photoelectric barrier is advantageous since in this way it is possible to detect a further visible symbol or visible state for the calculation of the probability.

In a further embodiment of the invention, the event and the consecutive event correspond to an event selected from the following list: a package is transported unimpeded and/or a package is removed from the conveyor section and/or a package is added to the conveyor section and/or a package becomes stuck at the position of the photoelectric barrier and/or a package becomes stuck between two photoelectric barriers.

In one embodiment of the invention, in addition to the detection of the photoelectric barrier pattern and the detection of the conveyor speed of the conveyor section, at least data of blockage detection modules and/or data of motors of the conveyor section and/or data of a reading tunnel of the conveyor section and/or routing decisions at flow branches are detected and taken into account in the estimation of an event sequence which has with the highest probability caused the photoelectric barrier pattern. The detection and addition of further data is advantageous since in this way the result of the estimation of an event sequence which has with the highest probability caused the photoelectric barrier pattern can be further improved. In particular, the data of the reading tunnel may contain the dimensions of the package and its weight.

The invention furthermore provides a computer program product comprising instructions which, when carried out by means of a data processing device, cause the data processing device to carry out the steps of the method according to claims 1 to 6.

The invention will be explained in more detail below with the aid of preferred embodiments with reference to the appended drawing. The features presented may in each case represent an aspect of the invention both individually and in combination. Features of various exemplary embodiments may be transferred from one exemplary embodiment to another.

Figure 2:
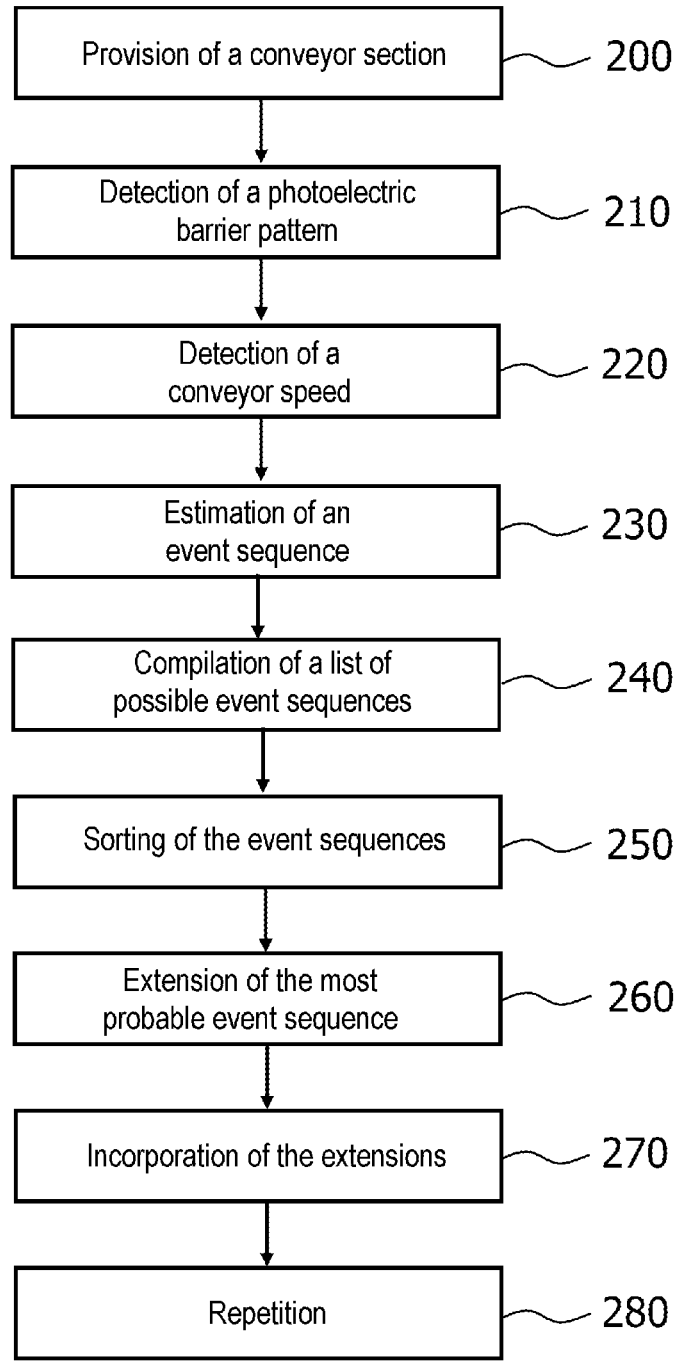
Figure 3:
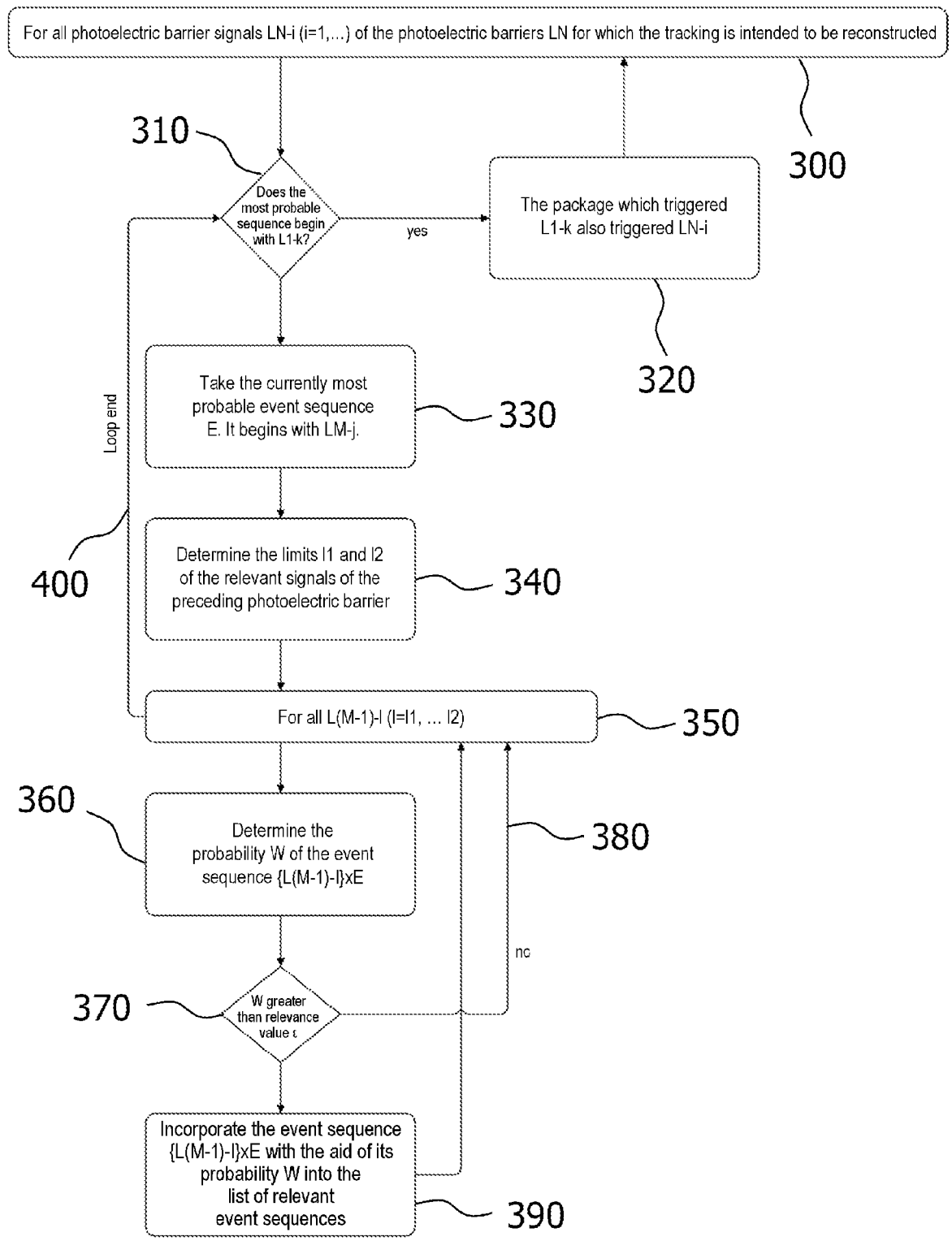

FIG. 1 shows a distance/time diagram of a plurality of packages on a conveyor section as well as a plurality of photoelectric barrier signals according to one exemplary embodiment of the invention, FIG. 2 shows a flowchart of a method for tracking packages on a conveyor section according to a first exemplary embodiment of the invention, FIG. 3 shows a flowchart of a method for tracking packages on a conveyor section according to a further exemplary embodiment of the invention, FIG. 1 shows a distance/time diagram of a plurality of packages on a conveyor section, as well as a plurality of photoelectric barrier signals L1-1, L1-2, L1-3, L2-1, L2-2, L3-1, L3-2, L3-3 according to one exemplary embodiment of the invention. The distance axis shows the position along the conveyor section. There are photoelectric barriers LS1, LS2 and LS3 at three positions on the conveyor section.

When a package moves past a photoelectric barrier LS1, LS2, LS3, the latter is interrupted for a certain time. The interruptions are indicated in FIG. 1 and denoted by L1-1 to L3-3.

The conveyor section conveys the packages for example continuously with a constant speed. In one exemplary embodiment of the invention, belt accelerations or belt stoppages may in particular also be taken into account. In the embodiment shown in FIG. 1, the packages on the conveyor section leave straight lines in the distance/time diagram. For example, a package which has caused the photoelectric barrier triggering L1-1 would travel through the distance/time diagram between the two dotted lines which begin at the ends of L1-1. Each further triggering of a photoelectric barrier LS2, LS3 would correspondingly lie between these dotted lines. If a package is delayed on its way, however, subsequent photoelectric barrier triggerings are shifted to the right (i.e. to a later time). If a package becomes stuck while it is triggering the photoelectric barrier LS1, LS2, LS3 then the photoelectric barrier signal L1-1, L1-2, L1-3, L2-1, L2-2, L3-1, L3-2, L3-3 becomes longer along the time axis.

In one exemplary embodiment of the invention, however, the following events, by way of example, may be allowed during the transport from one photoelectric barrier LS1, LS2, LS3 to the next.

| | Event | Occurrence probability |
|---|---|---|
| I | A package is transported unimpeded, i.e. constantly. | $C < 1$ |
| II | A package is removed. | $R \ll 1$ |
| III | A package is added. | $A \ll 1$ |
| IV | A package becomes stuck at the position of the photoelectric barrier LS1, LS2, LS3. | $S_L \ll 1$ |
| V | A package becomes stuck between the photoelectric barriers LS1, LS2, LS3. | $S_B \ll 1$ |

The list is not exhaustive, however, and may contain further events in further exemplary embodiments of the invention. For example, rotations of the packages may be allowed, so that the duration of the photoelectric barrier triggerings changes. A distinction may also be made between items becoming stuck for a long and short time, in which case items becoming stuck for a shorter time are provided with a different (higher) probability than items becoming stuck for a longer time.

An algorithm now determines which scenario, i.e. which constellation of packages along the conveyor section and which event sequence, has with the highest probability caused the pattern of photoelectric barrier triggerings L1-1, L1-2, L1-3, L2-1, L2-2, L3-1, L3-2, L3-3 indicated in FIG. 1. In this case as well, the example is simplified and it is given that the photoelectric barrier pattern can (factor 1) or cannot (factor 0) be explained by an event. In one embodiment of the invention, a probability factor of between 0 and 1 may also be provided in particular, in order for example to take into account and weight measurement inaccuracies. In one embodiment of the invention, the algorithm may in particular be a Viterbi algorithm.

FIG. 2 shows a flowchart of a method for tracking packages on a conveyor section according to a first exemplary embodiment of the invention. The flowchart relates in the exemplary embodiment to the distance/time diagram of a plurality of packages on a conveyor section as shown in FIG. 1 as well as the photoelectric barrier signals shown in FIG. 1.

The method starts with step 200, in which a conveyor section having a conveyor surface for conveying a sequence of packages is provided, the conveyor section comprising at least one photoelectric barrier LS1, LS2, LS3 for detecting the packages. The conveyor section may, for example, consist of one or more conveyor belts which transport the packages on a conveyor surface.

In step 210, a photoelectric barrier pattern 1 is detected by means of the at least one photoelectric barrier LS1, LS2, LS3, the photoelectric barrier pattern 1 being caused by an event sequence of the packages. The packages travel past the at least one photoelectric barrier LS1, LS2, LS3 by means of the conveyor section and thereby generate a photoelectric barrier pattern 1 by the packages interrupting the at least one photoelectric barrier LS1, LS2, LS3 for a certain time L1-1, L1-2, L1-3, L2-1, L2-2, L3-2, L3-3. The interruptions L1-1, L1-2, L1-3, L2-1, L2-2, L3-2, L3-3 are in this case dependent on the conveyor speed of the conveyor section. For this reason, the conveyor speed of the conveyor section, or the conveyor speeds of all individual conveyor belts, are detected in step 220.

In step 230, an event sequence which has with a highest probability caused the photoelectric barrier pattern 1 is estimated by means of an algorithm while taking into account the conveyor speed of the conveyor section. To this end, for example, a Viterbi algorithm may be used. The basic concept of the Viterbi algorithm is, starting from an empty set, to compile a list of possible event sequences and sort them with the aid of their occurrence probability. The most probable event sequence is then extended by all possible consecutive events. For each of these extensions, the probability of the sequence is determined and all extensions are correspondingly incorporated as a new possible event sequence into the list of event sequences. This is repeated until the most probable event sequence reflects the entire measured event chain. A list of possible event sequences is therefore compiled in step 240 and in step 250 the event sequences are sorted with the aid of their occurrence probability.

In step 260, the most probable event sequence is extended by all possible consecutive events, the probability of the event sequence being determined for each extension. The following events are, for example, considered as an event or as a consecutive event. A package is transported unimpeded and/or a package is removed from the conveyor section and/or a package is added to the conveyor section and/or a package becomes stuck at the position of the photoelectric barrier and/or a package becomes stuck between two photoelectric barriers.

The extension is incorporated in step 270 as a new event sequence into the list of event sequences. Steps 260 and 270 are repeated in step 280 until the most probable event sequence fully reflects the detected photoelectric barrier pattern.

FIG. 3 shows a flowchart of a method for tracking packages on a conveyor section according to a further exemplary embodiment of the method. The method begins with step 300, in which all photoelectric barrier signals LN-i (i=1, . . . ) of the photoelectric barriers LN for which the tracking of a package is intended to be reconstructed are provided. In step 310, a check is made whether the most probable event sequence begins with L1-$k$. If the most probable sequence begins with L1-$k$, it may be assumed in step 320 that the package which triggered L1-$k$ is also the package which triggered LN-i. If the most probable sequence does not begin with L1-$k$, the currently most probable event sequence E is taken in step 330, the event sequence beginning with Lm-j. In step 340, the limits l1 and l2 of the relevant signals of the preceding photoelectric barrier are determined. This is carried out in step 350 for all L(M-1)-l with l=l1, . . . , l2. In step 360, the probability W of the event sequence {L(M-a)-l}xE is determined, and in step 370 a check is made whether the probability W is greater than a relevance value ε. If the probability W is not greater than a relevance value ε, the method returns to step 350. If the probability W is greater than a relevance value ε, in step 390 the event sequence {L(M-1)-l}xE is incorporated with the aid of its probability W into the list of the relevant event sequences. The method subsequently returns to step 350. The loop end, and therefore the end of the method, is step 400, which returns from step 350 to step 310, in which a check is made whether the most probable event sequence begins with L1-$k$.

In one exemplary embodiment of the invention, the following events may be envisioned for the transition of a photoelectric barrier pattern 1 of a first photoelectric barrier LS1 to the photoelectric barrier pattern 1 of a second photoelectric barrier LS2.

| | Events of the packages P1, P2, P3 | Event probability | Matches photo-electric barrier pattern? | Probability |
|---|---|---|---|---|
| E1 | P1, P2 and P3 conveyed constantly | C · C · C | 0 | 0 |
| E2 | P1 is removed, P2, P3 travel constantly | R · C · C | 0 | 0 |
| E3 | P2 is removed, P1, P3 travel constantly | C · R · C | 0 | 0 |
| E4 | P3 is removed, P1 travels constantly, P2 becomes stuck in photoelectric barrier 2 | C · $S_L$ · R | 1 | C · $S_L$ · R |
| E5 | P1 travels constantly, P2 becomes stuck between the photoelectric barriers and is carried along by P3, which travels constantly. | C · $S_B$ · C | 1 | C · $S_B$ · C |
| . . . . . . | | . . . | 0 | 0 |

The list of event sequences contains two event sequences E4 and E5, the order thereof depending on whether $S_L$·R, is greater than $S_B$·C, or vice versa.

It is assumed that C·$S_L$·R>C·$S_B$·C. Each possible extension, i.e. each transition to the photoelectric barrier LS3, and the probability thereof, is then determined for the sequence E4. The following table shows all extensions which can be explained by the photoelectric barrier pattern LS3:

| | | Probability of the associated event | Total probability |
|---|---|---|---|
| E4-1 | P1, P2 travel constantly, a package P4 is inserted behind P2 | A | (C · $S_L$ · R) · A |

The event sequence list therefore now contains two elements E4-1 and E5. If (C·$S_L$·R)·A>C·$S_B$·C, the algorithm terminates since E4-1 explains the entire measured event chain. L3-1 has then been triggered by package 1, L3-2 by package 2 and L3-3 by a new package 4.

If (C·$S_L$·R)·A<C·$S_B$·C, the algorithm continues with E5. The following table shows all extensions of E5 which can be explained by the photoelectric barrier pattern LS3:

| | | Probability of the associated event | Total probability |
|---|---|---|---|
| E5-1 | P1, P2 travel constantly, P3 becomes stuck for a short time between the photoelectric barriers | $S_B$ | $(C \cdot S_B \cdot C) \cdot S_B$ |

Now, the event sequence list again contains two elements E4-1 and E5-1. Regardless of which sequence is more probable, the algorithm terminates anyway since both sequences explain the entire measured event chain. If $(C \cdot S_L \cdot R) \cdot A > (C \cdot S_B \cdot C) \cdot S_B$, then L3-1 has been triggered by P1, L3-2 by P2 and L3-3 by a new package P4. Otherwise, L3-1 has been triggered by P1, L3-2 by P2 and L3-3 by P3.

In one embodiment of the invention, a sliding observation filter may also be applied over the measured events, i.e. the events L1-$n$−1, L1-$n$, L1-$n$+1, and in accordance therewith the algorithm selects a limited number of relevant events from photoelectric barrier L2 to photoelectric barrier m.

The events may also be run through backward. That is to say, the process starts at a checkpoint for which the packages matching a specific photoelectric barrier signal L1-1, L1-2, L1-3, L2-1, L2-2, L3-1, L3-2, L3-3 are intended to be determined by backtracking, and then moves backward along the conveyor section through the photoelectric barrier signals L1-1, L1-2, L1-3, L2-1, L2-2, L3-1, L3-2, L3-3. That is to say, there is a photoelectric barrier signal L1-1, L1-2, L1-3, L2-1, L2-2, L3-1, L3-2, L3-3 and the probability of each previous signal of the preceding photoelectric barriers LS1, LS2, LS3 that has been triggered by the same package is determined. In addition, the possibility that the package has been placed on the conveyor section between the photoelectric barriers LS1, LS2, LS3 is also considered. For this calculation, the previous belt speed profiles of all belts between the photoelectric barriers LS1, LS2, LS3, the data of optionally provided blockage detection sensors, sensor data of the motors of the conveyor belts, etc., may in particular be taken into account. This backward process is followed until for example a reading tunnel, i.e. the first identification point on the conveyor section, has been reached.

LIST OF REFERENCES photoelectric barrier pattern 1
$1^{st}$ photoelectric barrier LS1
$2^{nd}$ photoelectric barrier LS2
$3^{rd}$ photoelectric barrier LS3
signal of the $1^{st}$ photoelectric barrier L1-1
signal of the $1^{st}$ photoelectric barrier L1-2
signal of the $1^{st}$ photoelectric barrier L1-3
signal of the $2^{nd}$ photoelectric barrier L2-1
signal of the $2^{nd}$ photoelectric barrier L2-2
signal of the $3^{rd}$ photoelectric barrier L3-1
signal of the $3^{rd}$ photoelectric barrier L3-2
signal of the $3^{rd}$ photoelectric barrier L3-3

The invention claimed is:

1. A method for tracking packages on a conveyor section, the method comprising the following steps:
    a) providing a conveyor section having a conveyor surface for conveying a sequence of packages, the conveyor section comprising at least one photoelectric barrier for detecting the packages,
    b) detecting a photoelectric barrier pattern by means of the photoelectric barrier the photoelectric barrier pattern being caused by the sequence of packages,
    c) detecting a conveyor speed of at least one subsection of the conveyor section,
    d) estimating an event sequence which has with the highest probability caused the photoelectric barrier pattern, while taking into account the conveyor speed of the conveyor section, by means of an algorithm, the algorithm comprising the following further steps:
    e) compiling a list of possible event sequences,
    f) sorting the event sequences with the aid of their occurrence probability,
    g) extending the most probable event sequence by all possible consecutive events, the probability of the event sequence being determined for each extension,
    h) incorporating the extensions as a new event sequence into the list of event sequences,
    i) repeating steps g) to h) until the most probable event sequence fully reflects the detected photoelectric barrier pattern.

2. A method according to claim 1, whereby the step of estimating an event sequence which has with the highest probability caused the photoelectric barrier pattern is carried out by means of a Viterbi algorithm.

3. A method according to claim 1, whereby the probability comprises a probability factor, the probability factor lying between 0 and 1,
    with a probability factor of 0, an event of the event sequence being excluded,
    with a probability factor of 1, the event of the event sequence has definitely taken place, and
    with a probability factor of 0<x<1, the probability of the event is neither excluded nor has definitely taken place.

4. A method according to claim 1, whereby the consecutive events are determined with the aid of a photoelectric barrier pattern of at least one further photoelectric barrier.

5. A method according to claim claim 1, whereby the event and the consecutive event correspond to an event selected from the following list of events: a package is transported unimpeded and/or a package is removed from the conveyor section and/or a package is added to the conveyor section and/or a package becomes stuck at the position of the photoelectric barrier and/or a package becomes stuck between two photoelectric barriers.

6. A method according to claim 1, whereby in addition to the detection of the photoelectric barrier pattern and the detection of the conveyor speed of the conveyor section, at least data of blockage detection modules and/or data of motors of the conveyor section and/or data of a reading tunnel of the conveyor section and/or data of routing decisions at flow branches are detected and taken into account in the estimation of an event sequence which has with the highest probability caused the photoelectric barrier pattern.

7. A computer program product comprising instructions which, when carried out by means of a data processing device, cause the data processing device to carry out the steps of the method according to claim 1.

* * * * *